Oct. 28, 1952 M. MAESER 2,615,543
SPRING TYPE CLUTCH
Filed March 8, 1948 3 Sheets-Sheet 1

Inventor
Mieth Maeser
By his Attorney

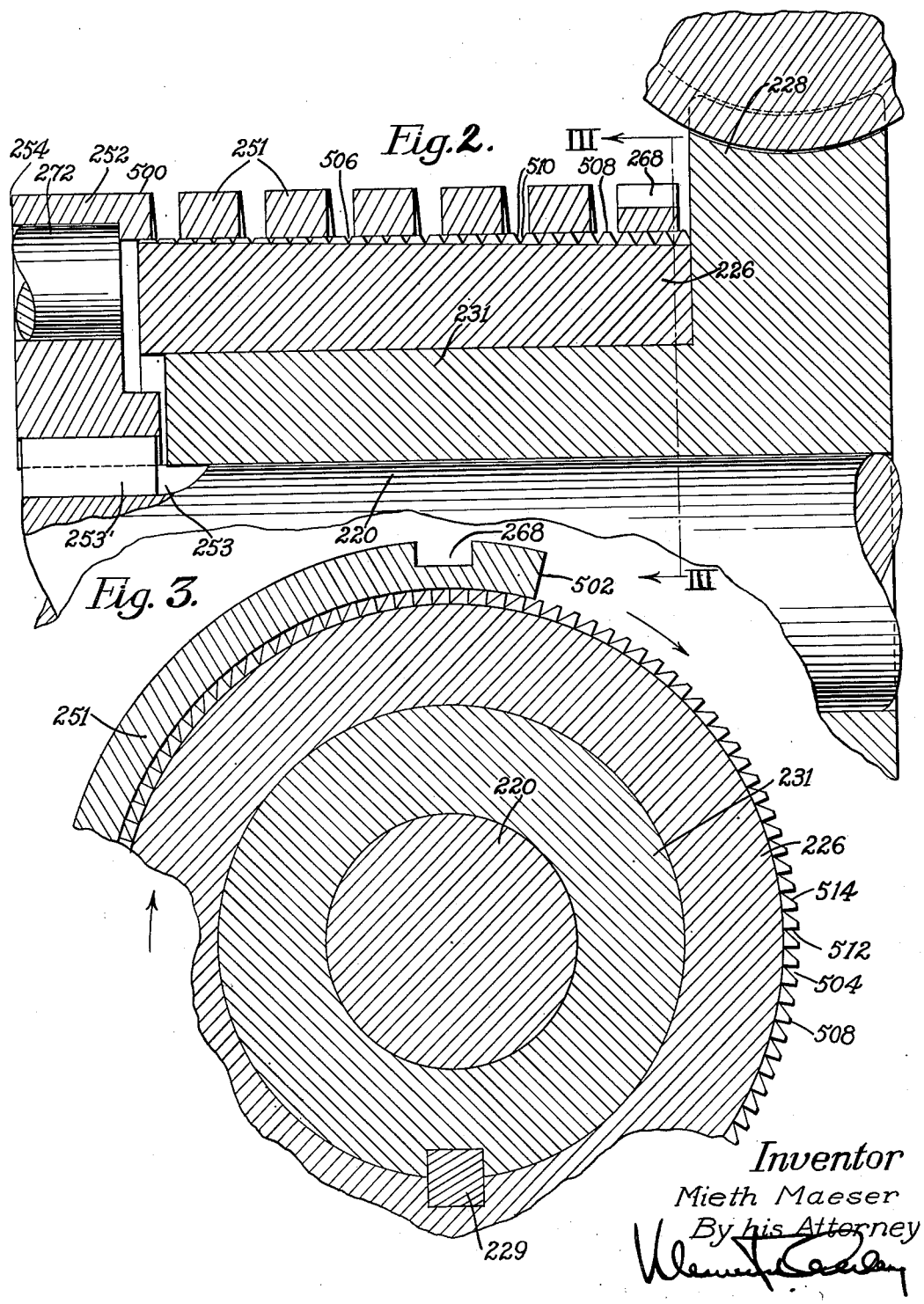

Oct. 28, 1952 M. MAESER 2,615,543
SPRING TYPE CLUTCH
Filed March 8, 1948 3 Sheets-Sheet 3

Inventor
Mieth Maeser
By his Attorney

Patented Oct. 28, 1952

2,615,543

UNITED STATES PATENT OFFICE 2,615,543

SPRING TYPE CLUTCH

Mieth Maeser, Beverly, Mass., assignor to United Shoe Machinery Corporation, Flemington, N. J., a corporation of New Jersey Application March 8, 1948, Serial No. 13,631

1 Claim. (Cl. 192—41)

This invention relates to coil spring clutches, otherwise known as torsion spring clutches, and it is herein illustrated and described as embodied in a clutch organization of the type disclosed in United States Letters Patent No. 2,442,401, granted June 1, 1948, upon an application filed in the names of August Dabrasky, William V. Goodhue and Galen M. Taylor.

Clutches of this type comprise two drive transmitting members, one of which drives and the other of which is driven, and a coil spring which frictionally couples the driven member to and uncouples it from the driving member. One end of the coil spring is positively secured to one of the drive transmitting members; the other end of the spring is free to the extent that it is not positively secured to a drive transmitting member. One of the drive transmitting members is a drum having a surface of revolution which is frictionally engageable by the spring to develop a driving torque to be delivered from the driving member to the driven member. The free end of the spring ("free" in the sense that it is not positively secured to either of the drive transmitting members) is connected to a device which controls the diameter of the spring to effect coupling and uncoupling. The control device, which is not part of the present invention, is disclosed and claimed in the above-mentioned Letters Patent No. 2,442,401.

In the clutch disclosed herein, as well as in the clutch disclosed in said application, the driving member is a rotary drum having a substantially cylindrical periphery which is frictionally engaged by the interior cylindrical surface of the spring; the spring, which surrounds the drum, is helical; and the "secured" end of the spring is secured to the driven member. The direction, i. e., right- or left-hand twist, of the helix of the spring is so chosen as to make the free end of the spring the leading end. If, therefore, the free end of the spring be arrested, a helical thrust will develop in the spring which will expand it diametrically and thereby unwrap or loosen it from the drum. Upon release of the free end of the spring, the spring will tighten about the drum (either through its own resilience or preferably through the action of a supplemental spring) and driving engagement will again take place and, because of the direction of the helix, the driving torque introduced into the spring by the drum will further tighten the spring about the drum.

A clutch of this type may be instantly uncoupled by arresting the free end of the spring, and thereby loosening the spring from the drum, at any desired point in the rotation of the driven member. The uncoupling is effected by interposing a stop, which is angularly adjustable about the axis of the clutch, into the path of an abutment rigidly connected to the free end of the spring.

In accordance with a common practice, the illustrated clutch is lubricated to prevent excessive heating and for various other reasons known in the art. However, when the spring engages the drum it must cut through the film of lubricant surrounding the drum and establish a metal-to-metal contact; otherwise the friction between the drum and the spring would be insufficient to develop a driving torque.

The coupling pressure per unit of area, or per unit of length measured along the helix of the spring, is weakest adjacent to the free end of the spring and strongest adjacent to the secured end. The reason for this is that that portion of the spring adjacent to its free end will, by frictional engagement with the drum, develop a certain amount of driving torque which is resisted by the drag (i. e., tendency to drag) of the driven member. The portion of the spring a little removed from the free end will therefore be under greater tension, and will therefore bear with greater force against the drum, than the portion closer to the free end; and this tension, with its resulting bearing force, will increase progressively toward the secured end of the spring, where it will reach a maximum. The bearing pressure at the free or weak end of the spring must still be sufficient to cut through the oil film, otherwise the increasing tension will not develop and the clutch will slip.

It is an object of the present invention to provide an improved coil spring clutch which satisfies the conditions above mentioned, and, more particularly, a coil spring clutch which may be operated instantly, with a minimum of force, and with a minimum extent of movement of the control mechanism; and, further, to provide a coil spring clutch which is certain in its operation and which is not subject to undue wear.

With this object in view and in accordance with a feature of the invention, the clutch drum disclosed herein has been recessed in such a way as to reduce its bearing surface to a greater extent adjacent to the free or weak end of the spring than adjacent to the secured end. Such reduction of bearing surface serves to increase the pressure of each unit area of contact between the spring and the drum; and such increase of pressure at the weak end of the spring enables that end of the spring to cut through the oil film. As shown herein, the drum may be recessed by forming grooves in it, and the spaces, or lands, between the grooves constitute the actual bearing surface of the drum. The grooves of the illustrated drum are in two sets, one extending in the direction of the axis of the drum and the other running helically. The helical grooves are arranged in the form of a sextuple screw thread. The grooves of both sets are V-shaped in cross section to provide a slope to at least one side of each groove. The grooves are all deeper adjacent to the free or weak end of the spring than adjacent to the secured end and, because of the variable depth and sloping sides, the reduction of bearing area of the drum is greatest adjacent to the free end of the spring and least adjacent to the secured end. The breaking up of the surface of the drum by intersecting grooves into isolated lands of relatively small individual extent is desirable for the further reason that less pressure per unit area is required to cut through an oil film of small extent than one of large extent. It is for this reason that the grooves are formed in the entire working surface of the drum, even including that portion adjacent to the secured or high-pressure end of the spring. The size of the lands diminishes progressively toward the end of the drum adjacent to the low-pressure end of the spring, and such reduction in size greatly increases the ability of the low-pressure portion of the spring to cut through the oil film.

The invention further consists of various features of construction and combinations and arrangements of parts herein shown and claimed, the advantage of which will be apparent to those skilled in the art from the following description, reference being had to the accompanying drawings in which Fig. 1 is an exploded view of a clutch organization embodying the present invention;

Fig. 2 is a longitudinal or axial section showing the engaging members of the clutch;

Fig. 3 is a cross section taken on the line III—III of Fig. 2; and

Figure 1:
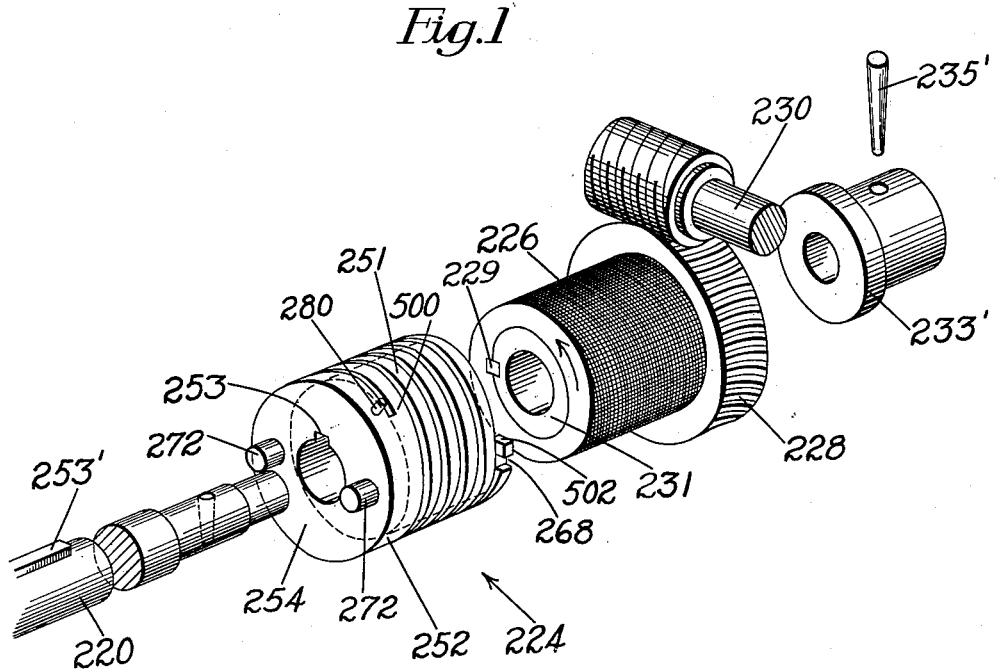

The organization of the clutch disclosed herein is similar to that of the clutch shown in Figs. 16 and 17 of the above-mentioned letters patent No. 2,442,401, and the various parts of the present clutch will, for convenience, be identified by the same reference characters as the corresponding parts of the clutch disclosed in said application. The driving member of the clutch consists of a substantially cylindrical drum 226 which is mounted upon a sleeve 231 and held against rotation with respect to said sleeve by a key 229. The sleeve 231 is the hub of a worm wheel 228 which meshes with and is driven by a worm on a driving shaft 230 (Fig. 1) which, in turn, may be driven from any suitable source of power. The driven member of the clutch consists of a shaft 220 upon which the sleeve 231 is mounted for free rotation with respect thereto. A collar 233' secured upon the shaft 220 by a pin 235' retains the sleeve 231 and worm wheel 228 upon the shaft. Inasmuch as the driving torque passes through both the drum 226 and the shaft 220, these members may be regarded as drive transmitting members.

For transmitting a driving torque from the drum 226 to the shaft 220 there is provided a device 224 (Fig. 1) comprising a coil spring 251 cut in the form of a left handed helix from a cylinder having a closed end 254. A portion 252 of the original cylinder adjacent to the closed end 254 is left uncut; the spring 251 does not, therefore, extend all the way to the closed end 254, but constitutes an integral extension of the uncut portion 252 of the original cylinder. The closed end 254 has a central bore which fits over the shaft 220 and which is held against rotation relatively to the shaft 220 by a key 253' engaging a keyway 253 in the closed end 254.

One end of the spring 251, indicated herein by the reference numeral 500, is continuous with the closed end of the cylinder 252—254 which, as has already been pointed out, is keyed to the shaft 220. Because of such connection to the shaft, the end 500 of the spring will be termed the "secured" end of the spring. The opposite end of the spring, indicated herein by the reference numeral 502, is not directly connected to either the driving or driven member and it will therefore be termed the "free" end of the spring. The direction (i.e., right or left twist) of the helix of the spring 251 is so chosen that when the spring is in driving engagement with the drum 226 and rotates in the direction of the arrow shown on the drum 226 in Fig. 1 the free end 502 of the spring will be the leading end. The helix of the illustrated spring is therefore left handed.

Control of the engagement of the spring 251 with the drum 226 is effected through the free end 502 of the spring. If the spring is already clutched to the drum and is therefore rotating with it, the spring may be expanded to uncouple it from the drum by arresting the rotation of the free end 502. Conversely, if the spring is already uncoupled from the drum, release of the free end 502 will enable it to be contracted and tightened about the drum. Control of the spring 251 is provided by mechanism disclosed in the above-mentioned Letters Patent No. 2,442,401, which mechanism acts upon the spring through a notch 268 adjacent to the free end 502 of the spring and also through a pair of diametrically opposed pins 280 extending outwardly from the solid cylindrical portion 252. Said mechanism acts also through studs 272 to prevent excessive rebound.

Figure 4:
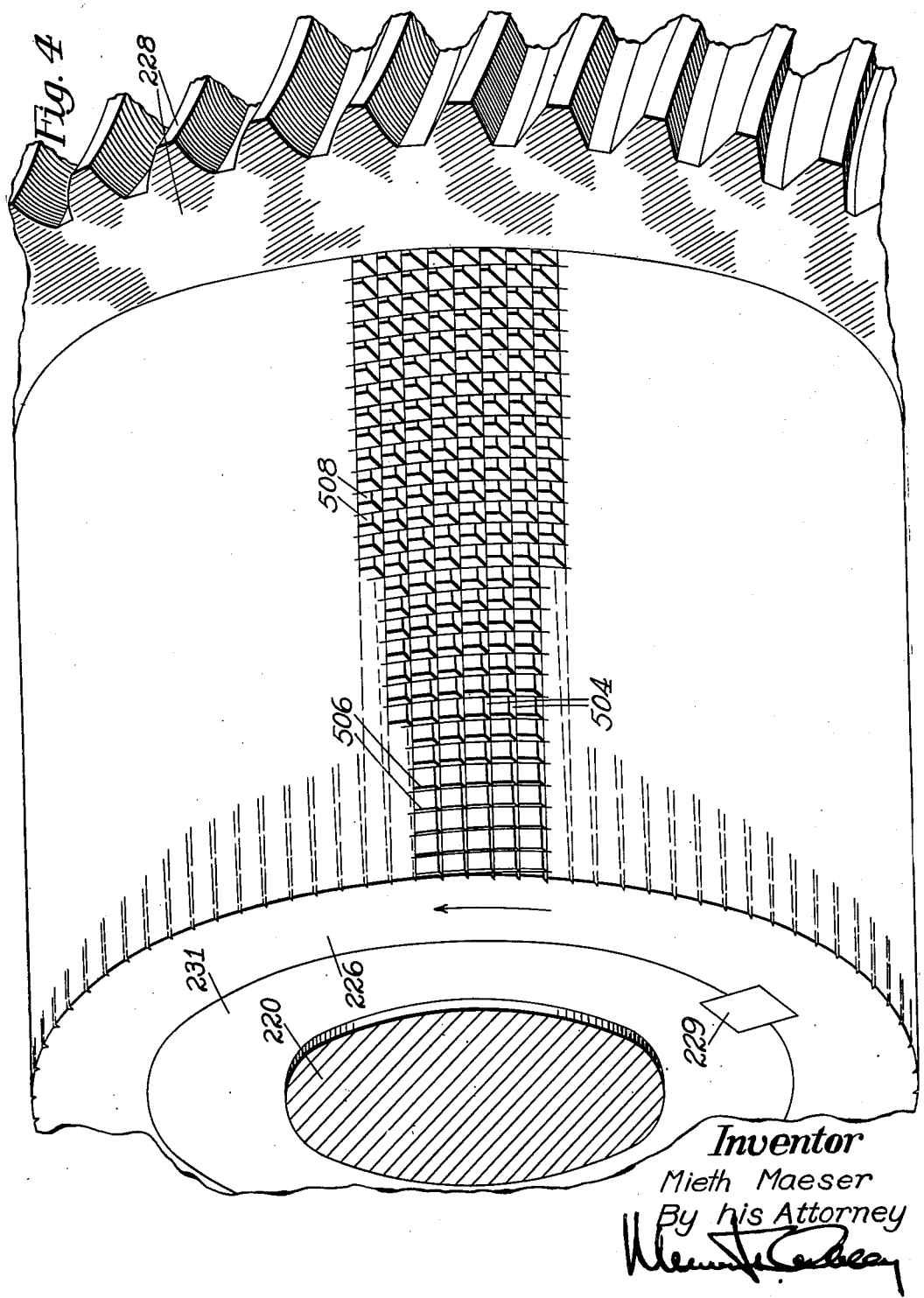
Fig. 4 is an angular view of the improved clutch drum.

The drum 226 (see Figs. 2, 3, and 4) shown herein has an operative surface different in character from that of the drum disclosed in the above-mentioned application. Formed in the periphery of the drum 226 are a plurality of grooves 504 extending in the direction of the axis and hereinafter termed axial grooves. Intersecting the axial grooves 504 are a plurality of helical grooves 506 As a result of such grooving the peripheral surface of the drum is broken up into a number of isolated lands 508. Because the grooves 506 are helical, each land 508 is slightly offset from the lands which immediately precede and follow it as the drum rotates. Such staggering of the lands distributes the wear uniformly over the bearing surface of the spring 251.

The axial grooves 504 and the helical grooves 506 are V-shaped in cross section and are deeper at the low pressure end of the drum, i. e., the end which is adjacent to the free end 502 of the clutch spring 251, than at the high pressure end, i. e., the end which is adjacent to the secured end 500 of the clutch spring. Such variation in the depth of the grooves 504 and 506 progresses uniformly from one end of the drum to the other, with the result that more of the surface material of the drum is removed adjacent to the low pressure end of the drum than adjacent to the high pressure end. The lands 508 adjacent to the low pressure end are thus smaller than the lands 508 adjacent to the high pressure end. The pressure per unit area of actual contact is therefore more uniformly distributed along the length of the drum than would be the case if the lands were all of equal size.

The total contact area of the lands 508 is less than the contact area of the inner surface of the spring 251. To compensate for the smaller total area of the lands and to insure a long wearing life for the drum, the drum 226, or at least the surface portion of the drum, is made of harder material than the spring. The drum of the clutch illustrated herein is made of pack hardened or carburized steel.

The arrangement and dimensions of the grooves of a drum 226 which has proved satisfactory in operation will now be given. A drum of 2.5 inches length was turned to a diameter of from 3.082 to 3.084 inches. A sextuple set of right-hand helical grooves 504 (analogous to a right-hand sextuple thread) with one half inch pitch were so cut that the depth of the grooves was 0.012 inch at the high pressure end of the drum and 0.052 inch at the low pressure end. These helical grooves were cut with a 60° thread cutter to provide equal slopes on the opposite sides 510 of the grooves. One hundred and fifteen equally spaced axial grooves 504 were cut to a depth of from 0.015 inch at the high pressure end of the drum to 0.060 inch at the low pressure end. These axial grooves were cut with an unsymmetrical 45° milling cutter so arranged as to form one wall 512 (Fig. 3) of each groove in a plane which is radial with respect to the drum and the other wall 514 in a plane which is inclined at 45° to the radius. The drum 226 is driven in the direction indicated by the arrows on Figs. 1, 3, and 4, and the axial grooves 504 were so cut as to make the radial walls 512 the leading edges of the lands 508 and thereby to enable them to scrape oil effectively from the inner surface of the spring 251. It is evident that because of the sloping walls 510 and 514, the areas of the lands 508 at the low pressure end of the drum will be considerably less than the areas of the lands at the high pressure end.

Because of the relatively small areas of the lands 508 adjacent to the low pressure end of the drum 226, the pressure developed by the weak end or free end 502 of the clutch spring is sufficient to squeeze out the oil film between the lands and the spring and establish metal-to-metal contact. The friction resulting from this contact gives rise to a tension in the spring which increases progressively from the free end 502 to the secured end 500. Inasmuch as this tension causes the spring to contract and grip the drum more tightly as the torque increases, the clutching action is, in effect, positive.

Having described my invention, what I claim as new and desire to secure by Letters Patent of the United States is:

A coil spring clutch comprising a pair of drive transmitting members, one of which is a drum, and a coil spring having one of its ends secured to the other member and its opposite end free of both members, said spring being frictionally engageable with said drum to cause one member to drive the other, said drum having two sets of grooves which intersect to provide isolated lands, one set of grooves extending parallel to the axis of the drum and the other set running helically around the drum, the grooves of both sets being V-shaped in cross section to provide sloping walls and being deeper at that end of the drum which is adjacent to the free end of the spring than at the other end, whereby the lands adjacent to the free end of the spring will present smaller individual bearing areas to the spring than the lands adjacent to the secured end of the spring.

MIETH MAESER.

REFERENCES CITED

The following references are of record in the file of this patent:

UNITED STATES PATENTS

| Number | Name | Date |
| --- | --- | --- |
| 1,953,370 | Starkey | Apr. 3, 1934 |
| 2,336,757 | Starkey | Dec. 14, 1943 |
| 2,442,401 | Dabrasky et al. | June 1, 1948 |
| 2,479,965 | Ragsdale | Aug. 23, 1949 |